Oct. 8, 1935.  A. LINCOLN  2,016,641
OIL AND GAS SEPARATOR
Filed Sept. 15, 1933
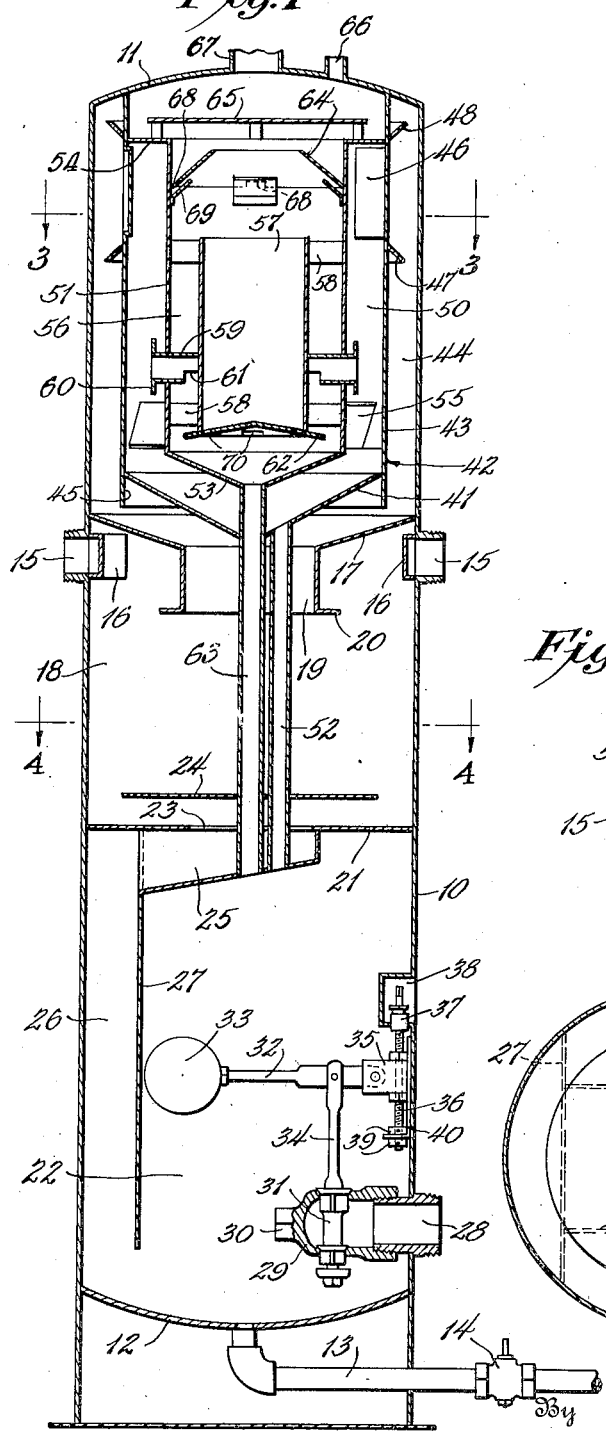
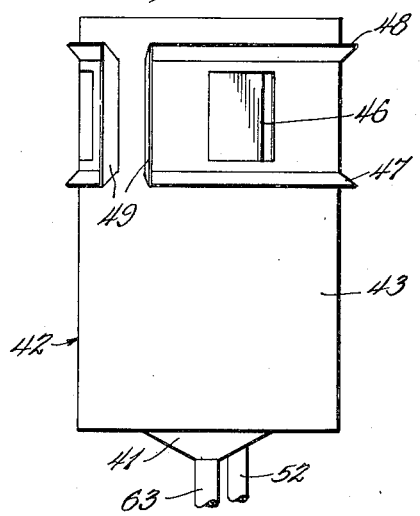
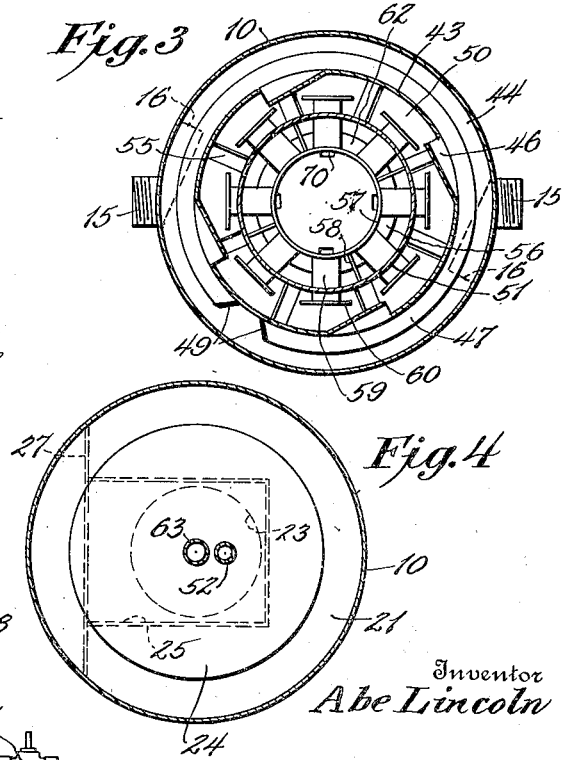
Inventor
Abe Lincoln
By A. D. Adams
Attorney Patented Oct. 8, 1935

2,016,641

UNITED STATES PATENT OFFICE 2,016,641

OIL AND GAS SEPARATOR

Abe Lincoln, Electra, Tex.

Application September 15, 1933, Serial No. 689,644

8 Claims. (Cl. 183—2.7)

This invention relates to oil and gas separators and, among other objects, aims to provide an improved, relatively simple, composite unit to effect the separation of gas and oil. This application embodies certain improvements on Patent No. 1,835,957 issued to me December 8, 1931.

Other aims and advantages of the invention will appear in the specification, when considered in connection with the accompanying drawing, wherein:

Fig. 1 is a central longitudinal section taken through the improved apparatus;

Fig. 2 is an elevation of the secondary scrubbing unit forming a part of the apparatus;

Fig. 3 is a sectional view taken on line 3—3 of Fig. 1; and

Fig. 4 is a sectional view taken on line 4—4 of Fig. 1.

Referring particularly to the drawing, the apparatus is there shown as comprising an upright tank 10 having a convex top 11 and a concave bottom 12, the latter being elevated sufficiently to permit the connection of a drain pipe 13 having a control valve 14.

The tank is provided with one or more inlets 15 having nozzles 16 arranged to direct the incoming oil substantially horizontally around the inner surface of the tank. These nozzles are located above the central portion of the tank and close beneath a cone shaped partition 17 forming the bottom of a secondary separating chamber and the top of the primary separating chamber 18. The bottom 17 has a central depending inlet nozzle 19 extending below the level of the nozzles 16. This nozzle has at its lower end an outwardly extending flange 20 for a purpose to be later described.

The oil and gas entering the chamber 18 are directed around the inner surface of the tank and take a spiral course downwardly. The oil, being heavier, separates and turns spirally down the wall of the tank by centrifugal force, while the lighter gas and gas vapors are separated from the oil and are forced to occupy the central portion of the chamber 18. The gas and gas vapor being mixed with oil on entering the chamber 18, are of course, given a definite downward movement, but after being separated from the oil, the lighter vapors and gas reverse their direction and move upwardly passing through the inlet nozzle 19. The heavy oil falls in a spiral movement on a partition 21 extending across the tank and forming the bottom of the chamber 18 and also the top of the oil reservoir 22 in the lower portion of the tank. The partition 21 has a central opening 23 to permit the oil to flow into the reservoir.

The heavier vapor in the chamber 18 descends spirally to a disc or baffle plate 24 held spaced above the partition 21 and having a diameter larger than the opening 23. The heavy vapor on striking the disc 24 moves spirally outwardly and some of the oil is deposited on the disc. The light vapor then rises and passes through the nozzle 19 while the oil separated from the vapor drops from the periphery of the disc onto the partition 21.

The oil in the bottom of the chamber 18 passes through the opening 23 to a trough 25 where it is conducted to a vertical flume 26 formed by a plate 27 extending across a chord of the tank. This plate extends from the partition 21 to a point near the bottom of the tank. The oil passes down the flume 26 and into the reservoir 22 where the sand settles out and is removed through pipe 13.

The oil leaves the tank through an outlet nipple 28 which is controlled by an adjustable float valve. In this instance the valve casing 29 has a non-circular extension 30 to facilitate threading it on the outlet nipple 28. The valve body 31 has two valve heads controlling openings in the top and bottom of the casing, the lower end of the valve having a removable stop washer below the casing to limit the opening movement of the valve (Fig. 1). A float arm 32 having a float 33 is connected to the upper end of the valve stem 34 and is pivoted on an adjustable fulcrum block 35 which may be raised or lowered by means of a screw 36 threaded through the block and extending through a stuffing box 37 into a pocket 38 formed in the wall of the tank so that the screw can be operated from the outside. The screw is restrained from moving longitudinally by means of collars 39 secured on the screw on each side of a bracket 40 which is secured to the wall of the tank and through which the screw passes. The oil level in the reservoir may be controlled from the outside of the tank by turning the screw in the proper direction to raise or lower the fulcrum block 35. As the oil reaches the predetermined level in the reservoir, it raises the float, which opens the valve and permits the oil to flow from the reservoir.

Thus far, the primary separation of the oil and the control of the outgoing fluid has been described. The secondary, or final, separation of the oil and gas begins when the gas and vapor enter the nozzle 19. As hereinbefore stated, the nozzle 19 has a flange 20, the idea being to prevent oil which collects on the outside wall of the nozzle from entering the nozzle. The vapor entering the nozzle 19 strikes against the conical bottom 41 of a secondary scrubbing unit 42 which is spaced above the partition 17.

This unit includes a cylindrical or shell separating cylinder 43 which is spaced from the tank wall 10 to provide an annular channel 44. The shell is secured at its upper end to the top 11 of the tank, thereby closing the upper end of the channel 44. The lower end of the shell extends below the bottom 41 to provide a flange 45 which causes the vapor, after striking the bottom, to move downwardly around the flange. As the vapor circulates around the bottom, some of its oil is separated and, in reversing its direction as it passes around the flange 45, further separation of oil is effected. The separated oil drops off the flange onto the partition 17 and passes downwardly through nozzle 19 to the bottom of chamber 18.

The vapor proceeds upwardly through channel 44 and passes into the shell through deflector nozzles 46, losing more of its oil by contact with the walls of the shell and tank. It will be noted that the nozzles 46 extend in the opposite direction to nozzles 16, thereby causing the vapor on entering the nozzles 46 to reverse its circular movement. This reversal causes the heavier constituents of the vapor to be forced against the walls of the channel 44 by the momentum of the vapor and to be precipitated thereon.

To prevent oil which collects on the shell 43 from entering the nozzles 46, a pair of annular flanges 47 and 48 are provided on the shell, one above and one below the nozzles 46. The lower flange 47 extends outwardly and downwardly at an acute angle to the side of the shell and thus prevents the precipitated oil from being forced above the flange by the gas. The upper flange extends outwardly and upwardly providing a trough which catches any oil precipitated above it on the shell. The flanges do not extend entirely around the shell, being smaller in circumference than the shell so that oil in the troughed flange 48 may run down the side of the shell. The ends of the flanges are connected together by vertical webs 49 to prevent the oil running downwardly from the trough from entering the space between the flanges.

The vapor entering the shell 43 is caused to whirl within an annular channel 50 which is formed by the shell and an inner separating cylinder 51, proceeding slowly downwardly. This action further precipitates the oil by centrifugal force on the inner surface of shell 43 where it falls to the bottom 41 and drains through a pipe 52 extending downwardly into the reservoir 22. The separating cylinder is shorter than the shell 43, having a conical bottom 53 and terminating at its upper end in an annular flange 54 which is spaced below the top 11 of the tank and secured to the wall of the shell 43 just above the nozzles 46. The flange closes the top of the channel 50 so that the vapor must move downwardly therein.

The rotary motion of the gas in this channel is converted into vertical force by a plurality of radial vanes 55 extending between the cylinder and the shell near the bottom of the cylinder 51 and placed at such an angle to the rotation of gas that a downward pressure is created. This pressure tends to empty the bottom of the shell of any foam which might form there and causes it to pass down the drain pipe 52.

From near the bottom of the channel 50, the gas passes into an annular channel 56 formed by the inner surface of the cylinder 51 and the outer surface of a cylindrical deflector 57 which is closed at its lower end and is held suspended in the cylinder by ribs 58 connecting the cylinders 51 and 57. The gas enters this channel 56 through tubular nozzles 59 arranged horizontally and extending radially through the wall of the cylinder 51. The outer ends of the nozzles 59 are spaced from the wall of the cylinder 51 and have annular flanges 60 to prevent oil which collects on the outer surfaces of the cylinder and nozzles from entering the nozzles. The inner ends of the nozzles abut against the deflector and have their lower portions cut away as at 61 so that the gas and vapor are directed downwardly in channel 56 against an annular flange 62 at the bottom of the deflector 57. The flange 62 breaks the force of the gas flow and deflects the vapor and precipitated oil against the inner wall of the cylinder 51. This reverses the direction of flow of the gas, thereby reducing its force so that it then proceeds slowly upwardly in channel 56. The precipitated oil falls to the bottom 53 and drains through pipe 63 which extends parallel to the pipe 52 into reservoir 22.

The gas proceeds upwardly in channel 56 and through a conical nozzle 64 near the top of the cylinder 51, then strikes a large disc baffle 65 which extends across and is spaced above the upper open end of the cylinder 51. In striking against nozzle 64 and baffle 65 the last particles of oil are precipitated out and the gas escapes through an outlet 67 in the top of the tank. A suitable safety valve may be located in outlet 66 as shown in my prior patent.

The oil which collects on baffle 65 runs down the inside of the cylinder 51 and through openings 68 in the lower edge of the nozzle 64. The openings are closed against the upward flow of gas by small baffles 69 located beneath them. Any oil which collects inside of the cylinder 57 drains through openings 70 and finds its way to the reservoir 22 through drain 63.

It is to be noted that the various parts are so arranged that all of the oil which is separated out finds its way to the reservoir and also that, due to the tortuous path the vapor must take in passing through the apparatus, practically all of the oil is reclaimed so that only gases leave through the outlet 66.

Obviously, the present invention is not restricted to the particular embodiment thereof herein shown and described. Moreover, it is not indispensable that all the features of the invention be used conjointly, since they may be employed advantageously in various combinations and subcombinations.

What is claimed is:

1. In an oil and gas separator, an upright tank; fluid inlets in the tank; a frusto-conical partition extending across the tank above the inlets and having a central depending cylindrical nozzle; a shell within the tank above the partition and spaced from the tank wall; a bottom wall in said shell above its lower end, whereby the lower end portion constitutes an annular baffle above said frusto-conical partition; vapor inlets discharging tangentially into the upper portion of the shell; means to prevent oil on the outside of the shell from entering the inlets; a separating cylinder in the shell and having inlets communicating with the shell; a cylindrical deflector in the separating cylinder having an upright conical bottom above the bottom of said separating cylinder and draining therein; a gas escape pipe communicating with the separating cylinder; and means to drain the oil in the separating cylinder and shell to the bottom of the tank.

2. In an oil and gas separator, an upright tank; spaced upper and lower partitions extending across the tank providing an upper secondary separating chamber an intermediate primary separating chamber and a lower oil reservoir; said partitions each having a central opening; a gas outlet for the secondary chamber; a flume below the lower partition at one side of the reservoir; a trough leading from the opening in said lower partition to said flume; an oil outlet for the reservoir; an adjustable float valve in the reservoir controlling said outlet; and means to adjust the float valve from the outside of the tank.

3. In an oil and gas separator, an upright tank; upper and lower partitions extending across the tank providing a secondary chamber in the upper portion of the tank; a primary chamber in the intermediate portion and an oil reservoir in the lower portion of the tank; said lower partition having an opening therein; a baffle extending across the opening above the same; an oil outlet for the reservoir; fluid inlets in the primary chamber; a depending nozzle on the upper partition extending below said inlets; a series of concentric shells in the secondary chamber having inlets therein; means to drain oil from the secondary chamber and shells to the reservoir; and a gas outlet for the inner shell.

4. In combination with an upright tank, a spaced separating cylinder therein having openings in the lower portion thereof; a spaced cylindrical deflector within the separating cylinder; tubular inlet nozzles extending radially through said openings and projecting outwardly and inwardly from said separating cylinder; and annular flanges on the outer ends of the nozzles, the inner ends of said nozzles abutting against said deflector and having openings in the bottom thereof adjacent the deflector to direct fluid downwardly.

5. In combination with an upright tank, a spaced separating cylinder therein having openings in the lower portion thereof; a spaced cylindrical deflector within the separating cylinder having a conical bottom; an outwardly and downwardly extending annular flange at the bottom of the deflector; tubular inlet nozzles extending radially through said openings and projecting outwardly and inwardly from said separating cylinder; and annular flanges on the outer ends of the nozzles, the inner ends of said nozzles abutting against said deflector and having openings in the bottom thereof adjacent the deflector to direct fluid downwardly against said annular flange on the deflector.

6. In an oil and gas separator, an upright tank; fluid inlets in the tank; a partition extending across the tank above the inlets and having a central depending nozzle; a shell within the tank above the partition and spaced from the tank wall; vapor inlets discharging tangentially into the upper portion of the shell; means to prevent oil on the outside of the shell from entering the inlets; a separating cylinder in the shell and having inlets communicating with the shell; a cylindrical reflector in the separating cylinder, radial vanes extending between said shell and separating cylinder near their lower ends, each arranged at an angle to a radial plane to stop the spiral movement of the descending vapor and cause it to descend vertically; and means to drain the oil in the deflector, separating cylinder and shell to the bottom of the tank.

7. In an oil and gas separator, an upright tank; fluid inlets in the tank; a frusto-conical partition extending across the tank above the inlets and having a central depending nozzle; a shell within the tank above the partition and spaced from the tank wall; a conical bottom secured in said shell above the lower end whereby the lower end of the shell wall provides an annular baffle around the conical bottom between the bottom and said partition; vapor inlets in the upper portion of the shell; means to prevent oil on the outside of the shell from entering the inlets; a separating cylinder in the shell and having inlets communicating with the shell; a gas escape pipe communicating with the separating cylinder; an oil outlet in the lower end of the tank; and a float valve in the tank controlling said outlet.

8. In an oil and gas separator, an upright tank; fluid inlets in the tank; a partition extending across the tank above the inlets and having a central depending nozzle; a shell within the tank above the partition and spaced from the tank wall; vapor inlets in the upper portion of the shell; means to prevent oil on the outside of the shell from entering the inlets; a separating cylinder in the shell and having inlets communicating with the shell; an annular flange connecting the upper end of said separating cylinder to the shell wall below the top thereof providing a chamber at the top of the tank; a baffle supported on said flange; a gas escape pipe communicating with the upper end of the tank; an oil outlet in the lower end of the tank; and a float valve in the tank controlling said outlet.

ABE LINCOLN.